(12) United States Patent
Brown et al.

(10) Patent No.: US 7,190,468 B2
(45) Date of Patent: Mar. 13, 2007

(54) BACKGROUND DOCUMENT RENDERING SYSTEM AND METHOD

(75) Inventors: Mark L. Brown, Boise, ID (US); Vincent C. Skurdal, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 929 days.

(21) Appl. No.: 10/196,792

(22) Filed: Jul. 17, 2002

(65) Prior Publication Data

US 2004/0015781 A1    Jan. 22, 2004

(51) Int. Cl.
*G06F 15/00* (2006.01)
*G06K 1/00* (2006.01)
(52) U.S. Cl. .................. 358/1.13; 358/1.15; 358/1.16; 709/229; 705/400; 382/325
(58) Field of Classification Search ............... 358/1.15, 358/1.16, 1.13, 1.14; 399/16; 705/400; 709/229; 382/325
See application file for complete search history.

(56) References Cited

U.S. PATENT DOCUMENTS

| | | | | |
|---|---|---|---|---|
| 5,604,846 A | * | 2/1997 | Kadota | 358/1.16 |
| 5,819,014 A | * | 10/1998 | Cyr et al. | 358/1.15 |
| 6,076,080 A | * | 6/2000 | Morscheck et al. | 705/400 |
| 6,219,149 B1 | * | 4/2001 | Kawata et al. | 358/1.15 |
| 6,393,164 B2 | * | 5/2002 | Shimizu et al. | 382/325 |
| 6,611,347 B1 | * | 8/2003 | Okada et al. | 358/1.15 |
| 6,785,727 B1 | * | 8/2004 | Yamazaki | 709/229 |
| 6,823,147 B2 | * | 11/2004 | Jackelen et al. | 399/16 |
| 7,046,385 B2 | * | 5/2006 | Mori et al. | 358/1.15 |

* cited by examiner

*Primary Examiner*—Kimberly Williams
*Assistant Examiner*—Satwant Singh

(57) ABSTRACT

A processor executes a document rendering application for an open document. When the open document is unedited and a predetermined portion of the processor is available, the document is rendered to an output buffer. The rendering is suspended when a predetermined interrupt is received and is resumed after the predetermined interrupt has been serviced. When the document has been edited, any rendered portion of the document is removed from the output buffer and the document is reset as being unedited.

57 Claims, 3 Drawing Sheets

BACKGROUND DOCUMENT RENDERING SYSTEM AND METHOD

FIELD OF THE INVENTION

The present invention relates to outputting devices. More particularly, the invention relates output rendering devices.

BACKGROUND OF THE INVENTION

In many situations, an outputting device (such as a peripheral output device or a printer) is coupled to a document processing device, such as a personal computer or a workstation, that helps render an output job (such as a print job) that is output by the outputting device (e.g. printed by the printing device). The document processing device generates one or more output jobs to be output by the outputting device. For example, the output jobs can be generated by one or more application programs (e.g. word processing programs, electronic mail programs, drawing programs, spread sheet programs, desk top publishing programs, etc.) executed by the document processing device. The output jobs may include any type of graphical elements or information supported by the outputting device, including text, pictures, and so forth. The document processing device typically translates the output job into a language that is understood by the outputting device. Where the outputting device is a printer, the language can be Printer Control Language (PCL) or Postscript. A particular outputting device may understand a single language, thereby requiring the processing device to translate the output job into that single language. This type of outputting device requires an attached processing device to convert the raw output job data into a format (i.e., language) that is understood by the outputting device.

Other outputting devices may be capable of processing output jobs in multiple languages. These outputting devices are typically more complicated because they are required to identify, interpret and process output commands in several different languages. Although these outputting devices are more complicated, they typically require an attached processing device to provide the output job and other output control information to the outputting device. Another type of outputting device contains its own output rendering engine that is capable of generating an output document from raw output job data. Although this type of outputting device contains its own output rendering engine, it is typically coupled to a document processing device, such as a computer, to receive the raw output job data generated, for example, by an application running on the computer.

A document processing device can execute different kinds of applications each of which can generate an output job that can be output by the outputting device upon a demand for same by a user. Prior to initiation of the demand for output, the user can continue to input data, edit files, create new files, etc. When the user does make a demand to the document processing device to generate an output job to be output by an outputting device, a significant amount of processing executed by the document processing device may be required in order to generate the output job. This processing can involve the generation in the output job of different types of graphical elements or information including text, pictures, and so forth. The time that the user must wait before the outputting device outputs the output job is dependent upon the amount of processing that the processing device and/or the outputting device require in order to generate the output job. In would be advantageous to decrease the time that the user must wait for the output job to be output by the outputting device. Consequently, there is a need for improved methods, programs, and systems that can provide such a capability.

SUMMARY OF THE INVENTION

The above-stated needs and/or others are met, for example, by methods, programs, and systems in which a processor executes a document rendering application for an open document. When the open document is unedited and a predetermined portion of the processor is available, the document is rendered to an output buffer. The rendering is suspended when a predetermined interrupt is received and is resumed after the predetermined interrupt has been serviced. When the document has been edited, any rendered portion of the document is removed from the output buffer and the document is reset as being unedited.

These and other features of the present invention will become more fully apparent from the following description and appended claims, or may be learned by the practice of the invention as set forth hereinafter.

DESCRIPTION OF THE DRAWINGS

A more complete understanding of the various methods, programs, and systems of the present invention may be had by reference to the following detailed description when taken in conjunction with the accompanying drawings wherein the same reference numbers are used throughout the drawings to reference like components and features, and wherein.

DETAILED DESCRIPTION

Figure 1:
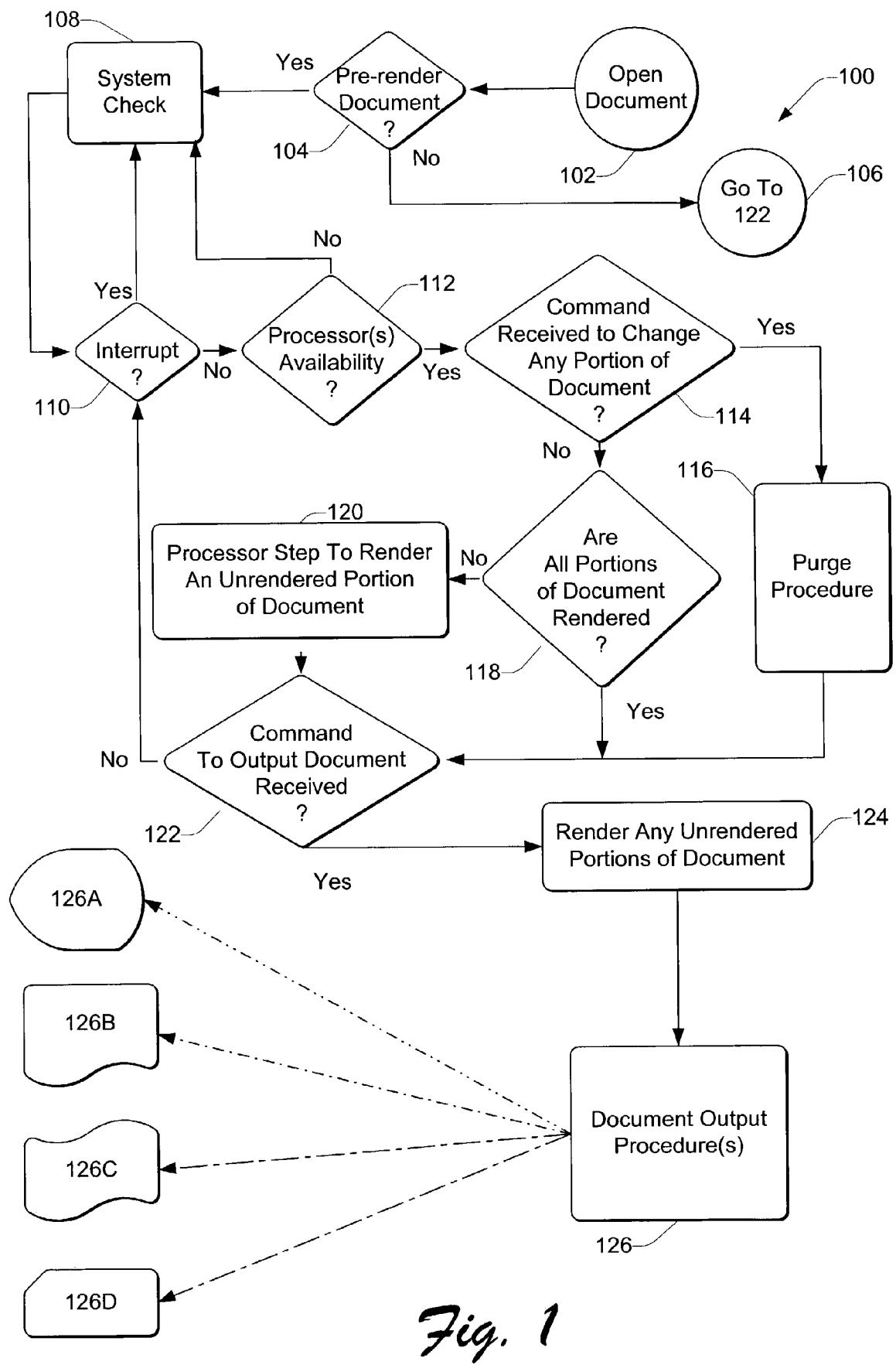
FIG. 1 is a flow diagram illustrating an embodiment of an inventive procedure for processing a particular output job.

The methods, programs, and systems, according to various embodiments of the present invention, relate to a pre-rendering of a document prior to a user demand for outputting the document. Rather than waiting for a user to initiate an output function, the document will be automatically rendered, although the rendered document will not yet be output by an outputting device, or a peripheral output device, until a confirmation message triggered by the user makes a demand for the document to be output.

Each time a document is opened in a document processing application executing on a computer, a driver begins to render the document so that can be sent to an outputting device, such as a printer, even before a demand for output from the user is made. If the driver completes the rendering tasks in the user's computer before the document is edited, the rendered document is sent to the printer just as it would be for a normal print job. The printer can then begin to format the rendered document for printing even though the printer will not begin the actual process of moving paper and placing marks on that paper for the rendered document until a confirmation message with the corresponding print job identification is sent by the user. Each time the user modifies the document (e.g. edits) in any way using the document processing application (e.g. adding or deleting a character in a text document or changing the formatting of a text document), the driver aborts its current pre-rendering of the document, any pre-rendered portions of the document created by the driver are logically and/or physically removed, any pre-formatted portions of the rendered document created by the printer are logically and/or physically removed, and the pre-rendering/pre-formatting tasks begin all over again. For instance, when the user edits the document after the pre-rendered document has already been communicated to an output buffer that is stored at the printer, a command can be sent to the printer to logically and/or physically discard the print job in the output buffer and the pre-rending of the document can be started all over again.

Where the document is unchanged, completely pre-rendered, and a printer driver has formatted the rendered document for printing by the printer, and where the user then decides to print the document by selecting a command to print, the print process will be perceived by the user to have been started significantly faster than without this pre-rendering process. As such, delays can be eliminated which normally occur from when the user selects a print function to when the printer begins to move paper and actually print the document. On complex pages this delay can be several seconds up to many minutes. This would also potentially allow the printer to be designed with lower-performance, and perhaps lower-cost, components.

The document that is rendered and output can have many forms. For instance, the document can be a letter containing text that is being edited by a word processing program, an electronic mail (e-mail) message that is being created by an e-mail program, a drawing that is created by the user by operating a drawing program, a spread sheet that the user is constructing by operating a spread sheet program, or a poster that is being designed by a user by operating a desk top publishing program. Other types of documents are also contemplated for use in embodiments of the present invention.

When the document is opened for editing by an application program executing on a processor of a document processing device, all or a portion of the document can be pre-rendered before the user requests a print out or other output of the document. Unedited portions of the document that have not yet been rendered to an output buffer by a document rendering application can be rendered to the output buffer.

The document rendering application can be configured so as to perform the pre-rendering functions at a predetermined low priority so that any latency in the document processing device due to the pre-rendering functions will be transparent to the user. For instance, the rendering can be performed only when a predetermined portion of cycles of a processor of the document processing device are available for executing instructions. Additionally, the pre-rendering performance can be suspended whenever a predetermined interrupt is received by the document processing device. When the predetermined interrupt has been serviced, the pre-rendering can be resumed.

As used herein the term "interrupt" means a signal that informs a program that an event has occurred. When a program receives an interrupt signal, it takes a specified action (which can be to ignore the signal). Interrupt signals can cause a program to suspend itself temporarily to service the interrupt. Interrupt signals can come from a variety of sources. For example, every keystroke generates an interrupt signal. Interrupts can also be generated by other devices, such as a printer, to indicate that some event has occurred. These are called hardware interrupts. Interrupt signals initiated by programs are called software interrupts. A software interrupt is also called a trap or an exception.

Conventional Personal Computers (PCs) support 256 types of software interrupts and 15 hardware interrupts. Each type of software interrupt is associated with an interrupt handler—a routine that takes control when the interrupt occurs. For example, when a user presses a key on a keyboard of PC, this triggers a specific interrupt handler. A complete list of interrupts and associated interrupt handlers can be stored in a table called the interrupt vector table, which in a PC typically resides in the first 1 K of addressable memory. Certain interrupts in a complete list of interrupts can be "predetermined" to cause a particular program to respond in a particular way. In one embodiment of the invention, a pre-rendering performance can be suspended whenever one such predetermined interrupt is received by the document processing device.

Whenever the user edits or makes a change to the document, all of the pre-rendered portions of the document, or only the pre-rendered portion that corresponds to the edited portion, can be physically or logically removed from the output buffer. The edited portion of the document can then be re-set as being unrendered and unedited so that the pre-rendering function can then be re-started from the beginning.

When the document processing device receives instructions to output the document, the document rendering application can then be executed in the processor so as to render any unrendered portion of the document for storage into the output buffer. This rendering upon the demand of the user will continue until all unrendered portions of the document have been rendered into the output buffer. When a significant portion of the document has been pre-rendered by the document rendering application prior to the user's request, a significantly smaller amount of rendering is required before a peripheral outputting device can begin outputting the rendered document from the output buffer.

When the document processing device receives instructions to output the document and all unrendered portions of the document have been rendered into the output buffer, the document processing device can output a signal that is capable of being received by the peripheral outputting device. The signal can be used by the peripheral outputting device to initiate the outputting of the rendered document from the output buffer. In one embodiment of the invention, the signal can be output by a processor executing an application in the document processing device.

After a document has been rendered by a document processing device and stored in an output buffer, it is ready to be output by an outputting device. In one embodiment of the present invention, the output buffer can be stored at the document processing device. When the document has been completely rendered into the output buffer, the rendered document can be transferred to the outputting device. The rendered document may or may not be formatted already for outputting by the outputting device. If the rendered document has not yet been formatted, then upon receipt the outputting device formats the rendered document into a format that can be output by the outputting device. In another embodiment of the present invention, the output buffer can be stored as a network resource on a network. When the document has been completely rendered into the output buffer, the rendered document can be transferred from the network resource through the network to the outputting device. Upon receipt, the outputting device may format the rendered document, if required, into a format that can be output by the outputting device. In still another embodiment of the present invention, the output buffer can be stored at the outputting device where the completely rendered document in the output buffer can also be formatted for immediate outputting by the outputting device.

In one embodiment of the present invention, the peripheral outputting device can be a printer, such as a simple dot matrix printer or a complex printer such as a digital press or a network printer. Complex printers can have capabilities that include high quality photo reproduction, multi-section reports with tabs, in-line mixed material insertion such as insertion of full-color preprinted copies and digital color-page insertion. Other complex printer capabilities include printing on substrates of varied composition, such as embossed, heavy-weight, multi-weight, and cover paper stock, as well as carbonless paper, blue prints, clear or colored transparency printing, and other specialty stock including preprinted offset color covers. Still other complex printer capabilities includes binding, collating, folding, stacking, stapling, stitching such as saddle stitching, edge-trimming, paginating for multi-language, and inline pagination and annotation. Still another printer is a multifunction peripheral (MFP), sometimes referred to as an "All-In-One", which combines two or more peripheral devices into a single device, such as printing, scanning, copying, and facsimile transmission.

When the peripheral outputting device is a printer, the output buffer can be a print buffer, and the signal from the document processing device can contain printer control language. The printer control language can be issued by the printer driver executing in the processor to control the printer. The signal from the document processing device can be received by a printer engine executing on a processor of the printer. The printer can be a Graphical Display Interface (GDI) printer or a printer interpreting a page description language. In one embodiment of the present invention, a print formatting device can assist a printer by formatting all or part of a print job prior to a user request for same. When the user does request the print job to be printed out by the printer, the print job is printed out faster because all or part of the print job has already been formatted. As such, the printer prints out print jobs faster and the user experiences less of a wait time for the print out.

In another embodiment of the present invention, the document rendering application executes on the processor of the document processing device to pre-render the document in the output buffer as a bitmap image of the document. The peripheral output device receives the bit map image of the document in the output buffer and then writes the bit map image in an output job, either with or without a preliminarily process of formatting of the bit map image of the document specifically for the peripheral output device.

In still another embodiment of the present invention, the document editing application and the document rendering application are included in a word processing application. In yet another embodiment of the present invention, the document rendering application includes a spooler for spooling print jobs into the output buffer.

FIG. 1 is a flow diagram illustrating an embodiment of the present invention as depicted in a procedure 100 for processing a particular output job. Procedure 100 begins at block 102 where a document processing device executes a document editing application on one or more processors. A user can open a document using an operation of the document editing application. A query is made a block 104 whether an option has been set to pre-render the document. If not, then procedure 100 terminates at block 122. If so, then procedure 100 moves to block 108 where a system check is preformed. A first check occurs at block 110 where it is determined whether a predetermined interrupt has been received that is as yet unserviced by the document processing device. If so, then procedure 100 returns to block 108. If not, then another query is made at block 112 as to whether the one or more processors of the document processing device are available. If not, then procedure 100 returns to block 108. If there is availability, such as by the availability of a predetermined portion of cycles of the one of more processors for the performance of pre-rendering instructions, then process 100 moves to the query at block 114. The system checks at blocks 110 and 112 can be used to ensure that any latency in the performance of the document processing device due to the pre-rendering instructions is transparent to the user of the document editing application.

At block 114, it is determined whether any change has been made to the document by the document editing application. If the document has been changed in any way, or in a way that affects the appearance of the printed document, then process 100 moves to block 116 where a purge procedure is conducted. The purge procedure is a logical and/or physical purging of any rendered portion of the document wherever the rendered portions of the document are stored. When any rendered portion of the document has been transmitted for storage at a peripheral device, the purge procedure ensures that the transferred portion will be logically and/or physically purged from the peripheral device at block 116. In an alternative embodiment of the invention, the purge procedure at block 116 ensures that only the rendered portion of the document that corresponds to the changed portion of the document is logically and/or physically purged from wherever it is stored, while retaining those portions of the rendered document that do not coincide with the changed portion of the document. The latter alternative can reduce pre-rendering processing overhead.

If it is determined at block 114 that no change has been made to the document by the document editing application, then procedure 100 moves to block 118 where it is determined whether the entire document being processed by the document editing application has been rendered into the output buffer. If not, then procedure 100 moves to block 120 where the one or more processors of the document processing device perform an incremental step to render an additional unrendered and unchanged portion of the document into the output buffer by using a document rendering application executing in the one or more processors, and then procedure 100 moves to block 122. If it is determined at block 118 that the entire document has been rendered into the output buffer, then procedure 100 moves to block 122. In one alternative embodiment of the invention, once an entire document has been pre-rendered, the pre-rendered document is transmitted in a transmission to a peripheral device. In yet another alternative embodiment of the invention, one or more transmissions can be made to a peripheral device either after or simultaneous with the rendering of the document. Once the pre-rendered document has been transferred to the peripheral device, any required formatting to the document can be performed by the peripheral device.

At block 122, it is determined whether the user has input a request to the document processing device to output the document. If not, procedure 100 moves to block 110. As a processor is available and all predetermined interrupts have been serviced, procedure 100 cycles repeatedly through the pre-rending function at block 120 to completely pre-render the document that the user is editing using the document editing application. If at block 122 the user has requested an output of the document, then procedure 100 moves to block 124 to render any unrendered portions of the document into the output buffer using the document rendering application executing in the one or more processors. After block 124, the output buffer contains a completed output job that includes an output rendered image of the document. Procedure 100 then moves to block 126 where one or more document output procedures are performed so that the rendered document can be output by the peripheral device. The one or more document output procedures may also perform some specific formatting of the output job prior to the outputting by the peripheral device.

The output requested can be made with a video projection or display device 126A, a hardcopy printed report 126B, a continuous printout such as ticker tape 126C, or other hardcopy such as a punch card 126D. Following the outputting of the output job from the output buffer by the outputting device represented by a peripheral device, the output job of the document is logically and/or physically purged from the output buffer. Procedure 100 can be repeated for each document processed by the document processing device.

When procedure 100 is operated in an environment where the document processing device is a personal computer and the outputting device is a printer, several parameters of operation can be implemented within the context of the pre-rendering a document in a computer and the pre-formatting in the rendered document in printer. To process an entire print job, the printer may need the ability to interpret a language or format in which the document is stored. For example, if the document data is stored in a raw data format and the printer only understands the Printer Control Language (PCL) language, then the printer cannot process the document until some other device or process converts the raw data into a PCL format. Here, the personal computer can be this device or perform this process. However, if the document is already stored in a format that is understood by the printer, then the printer can process the document without assistance from an external device. If the printer can process the entire print job, then the document is printed by the printer, as seen at block 126. If the printer cannot process the entire print job, then the portions of the document (i.e., print job) that it cannot process are delegated to other processing devices.

In a particular embodiment of the present invention, the printer can only render documents that are formatted in the native language of the printer. Thus, the printer may require all portions of a particular print job to be processed by the personal computer if all portions of the print job are in a non-native language of the printer. By supporting only a native printing language, the cost of such a printer is reduced.

Figure 2:
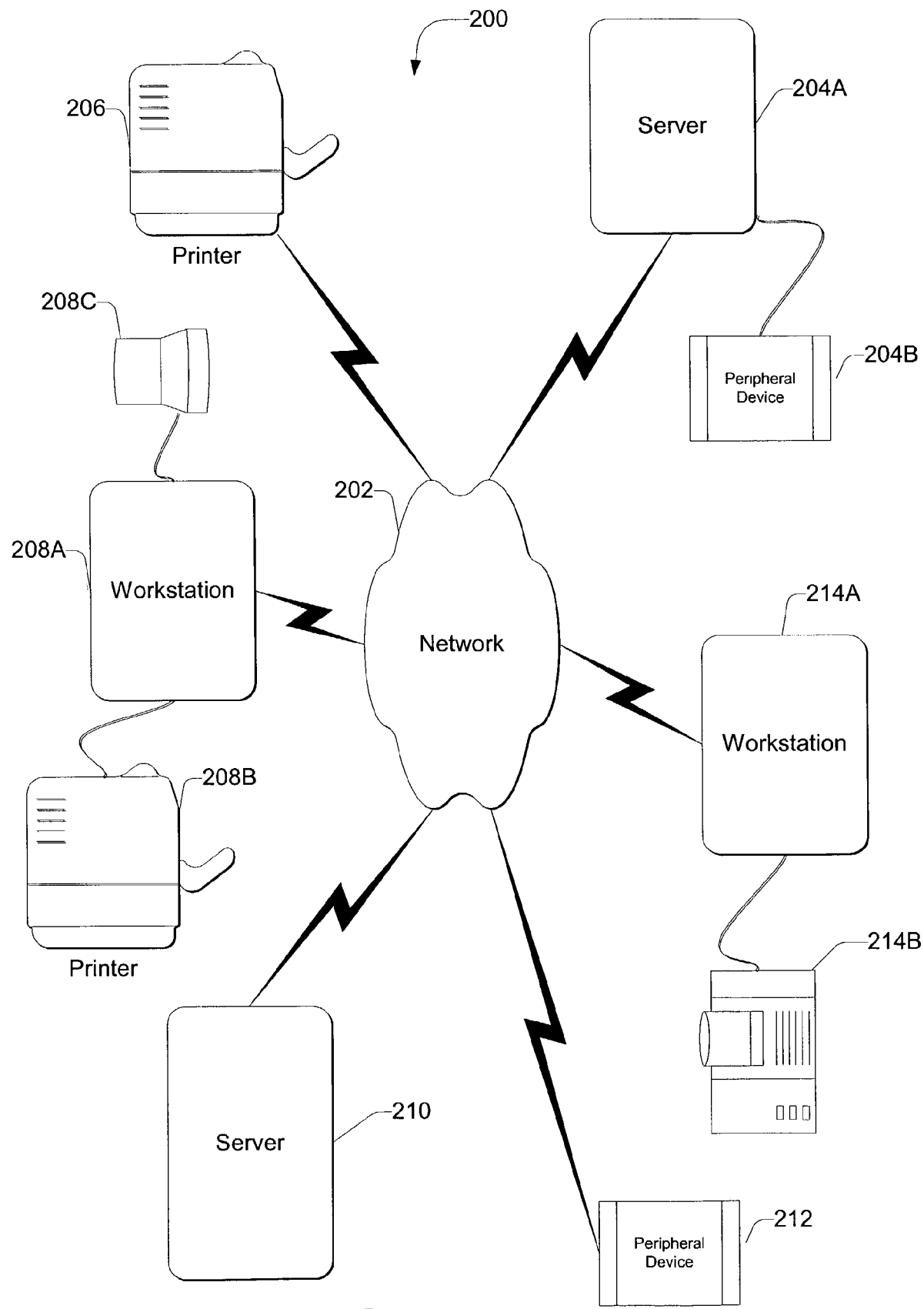
FIG. 2 illustrates a network environment in which multiple servers, workstations, and peripheral devices including printers are coupled to one another via a data communication network.

FIG. 2 illustrates a network environment 200 in which a plurality of network resources are communication via a data communication network. As such, multiple servers, workstations, and peripheral output devices are coupled to one another via network 202. The output buffer to store pre-rendered documents, as described above, can be stored on any network resource seen in FIG. 2. Network 202 couples together servers 204A and 210, computer workstations 208A and 214A, printers 206 and 208B, a computer monitor 208C, a video display projector 214B, and peripheral devices 204B and 212. Printer 208A, computer monitor 208C, a video display projector 214B, and peripheral device 204B are coupled to data communication network 202 through their respective local connections to workstation 208A, workstations 214A, and server 204A. Network 202 can be any type of network, such as a local area network (LAN) or a wide area network (WAN), using any type of network topology and any network communication protocol. In a particular embodiment, network 202 is the Internet. Although only a few devices are shown coupled to network 202, a typical network may include tens or hundreds of devices coupled to one another. Furthermore, network 202 may be coupled to one or more other networks, thereby providing coupling between a greater number of devices.

Servers 204A and 210A may be file servers, email servers, database servers, print servers, or any other type of network server. Workstations 208A and 214A can be any type of computing device, such as a personal computer. Particular embodiments of the invention illustrate printers 206 and 208B as laser printers. However, alternate embodiments of the invention are implemented with ink-jet, bubble-jet or any other type of printer including those referred to above. Furthermore, the teachings of the present invention may be applied to any type of printing device, such as copiers and fax machines. Although not shown in FIG. 2, one or more workstations and/or servers may contain a print rendering engine capable of converting raw print job data into a particular format (e.g., language) understood by certain types of printers. Peripheral devices 204B and 212 can be any type of device that can output an output job, including by soft copy such as by video display or by hardcopy such as on paper.

Figure 3:
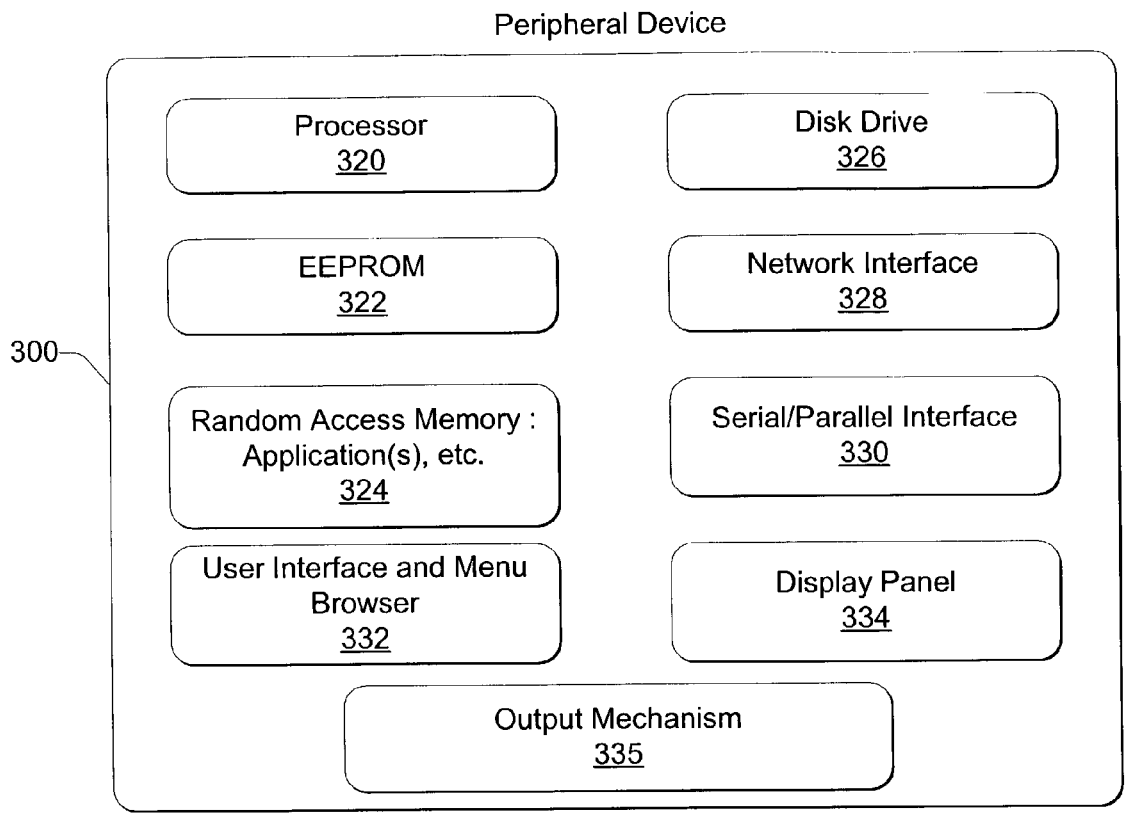
FIG. 3 is a block diagram showing pertinent components of a peripheral device in accordance with an embodiment of the invention.

FIG. 3 is a block diagram showing pertinent components of a peripheral device 300 can be used as an outputting device to output an output job. For example, peripheral device 300 can be a printer that includes one or more processors 320, hardware components of a printing device in an output mechanism 335, an electrically erasable programmable read-only memory (EEPROM) 322, and a random access memory (RAM) 324. The one or more processors 320 process various instructions necessary to operate peripheral device 300 and communicate with other devices. EEPROM 322 and RAM 324 can be used to store various types of information such as configuration information, fonts, templates, data being printed, and menu structure information. For instance, RAM 324 can be used to store one or more applications, such as peripheral device drivers, that can be executed by one or more processors 320. Although not shown in FIG. 3, a particular outputting device may also contain a ROM (non-erasable) in place of or in addition to EEPROM 322.

Peripheral device 300 can optionally include a disk drive 326, a network interface 328, and a serial/parallel interface 330. Disk drive 326 provides additional storage for data being printed or other information used by peripheral device 300. Although both RAM 324 and disk drive 326 are illustrated in FIG. 3, a particular outputting device may contain either RAM 324 or disk drive 326, depending on the storage needs of the outputting device. For example, an inexpensive printer may contain a small amount of RAM 324 and no disk drive 326, thereby reducing the manufacturing cost of the printer. The storage needs of the outputting device may require the storage of a printer engine in any of the storage components described above. In one embodiment of the invention, peripheral device 300 stores the output buffer containing a pre-rendered document in one or more of RAM 324 and disk drive 326. In another embodiment of the invention, peripheral device 300 has a memory for storing a pre-rendered document received from an output buffer, where peripheral device 300 formats the pre-rendered document so that is can be output by output mechanism 335.

Network interface 328 provides a connection between peripheral device 300 and a data communication network, such as network 202 seen in FIG. 2. Network interface 328 allows devices coupled to a common data communication network to send print jobs, menu data, and other information to peripheral device 300 via the network. Similarly, serial/parallel interface 330 provides a data communication path directly between peripheral device 300 and another device, such as a workstation, server, or other computing device. Although the peripheral device 300 shown in FIG. 3 has two interfaces (network interface 328 and serial/parallel interface 330), an outputting device may only contain one interface. Additionally, the interface can be other types of interfaces known in the art, such as Universal Serial Bus (USB), IEEE 1394, etc.

Peripheral device 300 can also contains a user interface/menu browser 332 and a display panel 334. User interface/menu browser 332 allows the user of peripheral device 300 to navigate a menu structure that is displayed by peripheral device 300 upon display panel 334. User interface 332 may be a series of buttons, switches or other indicators that are manipulated by the user of peripheral device 300. The display panel 334 of peripheral device 300 displays various menu options to the user of peripheral device 300. The display panel 334 and associated control buttons allow the user of peripheral device 300 to navigate, for instance, a menu structure that has a hierarchy of menu elements. When one of the menu elements is selected, the display changes to illustrate the new menu elements in the next level of the hierarchy. Alternatively, if the selected menu element is a function or other action to be performed by peripheral device 300, the appropriate procedure is performed. For example, if the selected menu element outputs a particular document, then peripheral device 300, serving in the role of an outputting device, performs the necessary operations to output the output job, such as by outputting a formatted version of a rendered document that is received by transfer from an output buffer.

Figure 4:
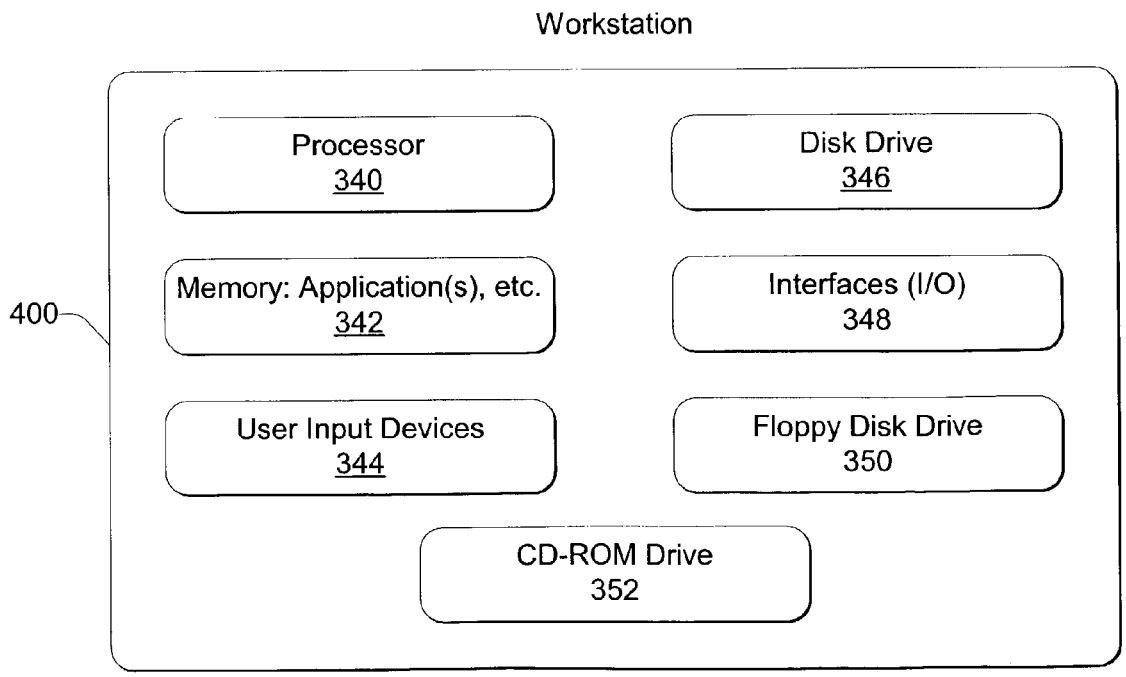
FIG. 4 is a block diagram showing pertinent components of a computer workstation in accordance with an embodiment of the invention.

FIG. 4 is a block diagram showing pertinent components of a computer workstation 400 in accordance with the invention. Workstation 400 includes a processor 340, a memory 342 (such as ROM and RAM), user input devices 344, a disk drive 346, interfaces 348 for inputting and outputting data, a floppy disk drive 350, and a CD-ROM drive 352. One or more processors 340 perform various instructions to control the operation of workstation 400. Memory 342, disk drive 346, and floppy disk drive 350, and CD-ROM drive 352 provide data storage mechanisms. User input devices 344 include a keyboard, mouse, pointing device, or other mechanism for inputting information to workstation 400. Interfaces 348 provide a mechanism for workstation 400 to communicate with other devices. Memory 342, disk drive 346, floppy disk drive 350, and/or CD-ROM drive 352 can be used to store an output buffer that contains a rendered version of a document, a bit map of an image of one or more page or segments of a document, or other versions of the document as is appropriate for a particular outputting environment. Other storage uses include a print spool or print buffer. The document can be processed by one or more applications executed by the one or more processors 340, where the applications can be stored in memory 342, disk drive 346, floppy disk drive 350, or CD-ROM drive 352. Examples of these applications include an operating system, a printer driver, a spooler program, and applications to process a document such as word processing programs, electronic mail programs, drawing programs, spread sheet programs, and desk top publishing programs, where some applications can include a spooler component.

Workstation 400 can include a rendering engine that is capable of processing data into a format understood by peripheral device 300. Similarly, the servers 204A and 210 and the workstations 208A and 214A seen in FIG. 2 can include respective rendering engines that can process raw data into a language understood by any printer or peripheral device seen in FIG. 2. These rendering engines can be capable of rendering a document into a directly printable format by incorporating any fonts, templates, or other data required to render the document. In FIG. 3, peripheral device 300 can be an inexpensive printer with a modest print engine. As such, to print most documents, peripheral device 300 will require assistance from a rendering engine.

Thus, although some preferred embodiments of the various methods, systems, and programs of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the scope of the invention as set forth and defined by the following claims.

What is claimed is:

1. A computer-readable medium having computer-executable instructions which, when executed on a processor, direct the performance of a method comprising:

when a predetermined portion of the processor is available for executing instructions, rendering an unedited open document to an output buffer with a document rendering application executing in the processor, wherein:

the document rendering application executing in the processor is suspended from the rendering of the document to the output buffer when a predetermined interrupt is received by the processor; and the document rendering application executing in the processor is resumed from the suspension to continue the rendering of the document to the output buffer after the predetermined interrupt received by the processor has been serviced;

upon editing of the unedited open document, setting as unrendered any said rendered portion of the unedited open document from the output buffer, and resetting the edited open document as being unedited.

2. The computer-readable medium as defined in claim 1, wherein the method further comprises, when the processor receives instructions to output the document:

rendering any unrendered portion of the document to the output buffer with the document rendering application executing in the processor until all unrendered portions of the document have been rendered into the output buffer.

3. The computer-readable medium as defined in claim 2, wherein the method further comprises outputting a signal from the processor that is capable of being received by a peripheral outputting device to initiate:

transferring of the rendered document in the output buffer in a transmission capable of being received by the peripheral outputting device for formatting into a format to be output by the peripheral outputting device.

4. The computer-readable medium as defined in claim 3, wherein:

the output buffer is a printer buffer; and the signal from the processor contains printer control language and is issued by a printer driver executing in the processor for controlling the peripheral outputting device.

5. The computer-readable medium as defined in claim 3, wherein the signal from the processor is for receipt by a printer engine executing on a processor of the peripheral outputting device.

6. The computer-readable medium as defined in claim 3, wherein the peripheral outputting device is selected from the group consisting of a Graphical Display Interface (GDI) printer and a printer interpreting a page description language.

7. The computer-readable medium as defined in claim 3, wherein the rendered document in the output buffer is a bitmap image of the document.

8. The computer-readable medium as defined in claim 3, wherein the peripheral outputting device is selected from the group consisting of a printer and a digital press.

9. The computer-readable medium as defined in claim 1, wherein the method further comprises, when all unrendered portions of the document have been rendered into the output buffer:
  transferring of the rendered document in the output buffer in a transmission capable of being received by a peripheral outputting device for subsequent formatting into a format to be output by the outputting device.

10. The computer-readable medium as defined in claim 1, wherein the document rendering application is included in a word processing application.

11. The computer-readable medium as defined in claim 1, wherein the document rendering application includes a spooler for spooling print jobs into the output buffer.

12. A computer-readable medium having computer-executable instructions which, when executed on a processor of a document processing device, direct the document processing device to perform a method comprising:
  when a document that is opened for editing by a document editing application executing in the processor has any unedited portion thereof that has not been rendered to an output buffer with a document rendering application executing in the processor, and when a predetermined portion of cycles of the processor are available for executing instructions, rendering the unedited portion of the document to the output buffer with the document rendering application executing in the processor, wherein:
    the document rendering application executing in the processor is suspended from the rendering of the unedited portion of the document to the output buffer when a predetermined interrupt is received by the document processing device; and
    the document rendering application executing in the processor is resumed from the suspension to continue the rendering of the unedited portion of the document to the output buffer after the predetermined interrupt received by the document processing device has been serviced;
  when the document is edited by the document editing application executing in the processor to form an edited portion thereof, setting as unrendered any said rendered portion of the document from the output buffer corresponding to the edited portion and resetting the edited portion of the document as being another said unedited portion.

13. The computer-readable medium as defined in claim 12, wherein the method further comprises:
  when the document processing device receives instructions to output the document, rendering any unrendered portion of the document to the output buffer with the document rendering application executing in the processor until all unrendered portions of the document have been rendered into the output buffer.

14. The computer-readable medium as defined in claim 13, wherein the method further comprises outputting a signal from the document processing device that is capable of being received by a peripheral outputting device to initiate:
  transferring of the rendered document in the output buffer in a transmission capable of being received by the peripheral outputting device for formatting into a format to be output by the peripheral outputting device.

15. The computer-readable medium as defined in claim 14, wherein:
  the output buffer is a printer buffer; and
  the signal from the document processing device contains printer control language and is issued by a printer driver executing in the processor for controlling the peripheral outputting device.

16. The computer-readable medium as defined in claim 14, wherein the signal from the document processing device is for receipt by a printer engine executing on a processor of the peripheral outputting device.

17. The computer-readable medium as defined in claim 14, wherein the peripheral outputting device is selected from the group consisting of a Graphical Display Interface (GDI) printer and a printer interpreting a page description language.

18. The computer-readable medium as defined in claim 14, wherein the rendered document in the output buffer is a bitmap image of the document.

19. The computer-readable medium as defined in claim 14, wherein the peripheral outputting device is selected from the group consisting of a printer and a digital press.

20. The computer-readable medium as defined in claim 12, wherein the method further comprises, when all unrendered portions of the document have been rendered into the output buffer:
  transferring of the rendered document in the output buffer in a transmission capable of being received by a peripheral outputting device for subsequent formatting into a format to be output by the peripheral outputting device.

21. The computer-readable medium as defined in claim 12, wherein the document editing application and the document rendering application are included in a word processing application.

22. The computer-readable medium as defined in claim 12, wherein the document rendering application includes a spooler for spooling print jobs into the output buffer.

23. A computer-readable medium containing a word processing program that, when executed by a processor, performs a method comprising:
  when a document opened for editing is unedited and a predetermined portion of the processor is idle, rendering one of more pages of the document as respective bitmaps of the document to a printer buffer, wherein:
    when a predetermined interrupt is received by the processor, suspending the rendering; and
    upon servicing of the predetermined interrupt, continuing the rendering;
  when the document is edited, setting as unrendered any said rendered one of more pages of the document from the printer buffer, and resetting the document as being unedited.

24. The computer-readable medium as defined in claim 23, wherein the method further comprises, upon receipt of instructions by the processor to output the document, rendering any unrendered pages of the document as respective bitmaps of the document into the printer buffer.

25. The computer-readable medium as defined in claim 24, wherein the method further comprises outputting a signal from the processor that is capable of being received by a printer to initiate:
   transferring of the rendered pages of the document as respective bitmaps of the document into the printer buffer in a transmission capable of being received by a printer for formatting into a format to being print by the printer.

26. The computer-readable medium as defined in claim 25, wherein the transmission is formatted by a printer driver in a printer control language to control the printer.

27. The computer-readable medium as defined in claim 25, wherein the transmission is received by a printer engine executing on a processor in the printer.

28. The computer-readable medium as defined in claim 25, wherein the printer is selected from the group consisting of a Graphical Display Interface (GDI) printer and a printer interpreting a page description language.

29. The computer-readable medium as defined in claim 25, wherein:
   at least two of the printer, the printer buffer, and the processor are included in separate network resources; and
   the separate network resources are in communication through an interconnecting network.

30. The computer-readable medium as defined in claim 23, wherein the method further comprises, after all pages of the document have been rendered as respective bitmaps of the document into the printer buffer, outputting a signal from the processor that is capable of being received by a printer to initiate:
   a transfer of the rendered pages of the document in the printer buffer to the printer; and
   a formatting of the transferred rendered pages of the document from the printer buffer into a format for printing by the printer.

31. The computer-readable medium as defined in claim 23, wherein the word processing application includes a spooler for spooling print jobs into the printer buffer.

32. A system comprising a processor and a memory including a document, a document editing application, a document rendering application, and an output buffer, wherein:
   when the document is opened for editing by the document editing application executing in the processor and is unedited thereby and a predetermined portion of cycles of the processor are available for executing instructions, the processor renders the document to the output buffer by executing the document rendering application;
   the document rendering application executing in the processor is suspended from the rendering of the document to the output buffer when a predetermined interrupt is received by the processor; and
   the document rendering application executing in the processor is resumed from the suspension to continue the rendering of the document to the output buffer after the predetermined interrupt received by the processor has been serviced; and
   when the document has been edited by the document editing application executing in the processor, setting as unrendered any said rendered portion of the document from the output buffer, and resetting the document as being unedited.

33. The system as defined in claim 32, wherein:
   upon receipt of instructions to output the document, the document rendering application executing in the processor renders any unrendered portion of the document to the output buffer until all unrendered portions of the document have been rendered into the output buffer.

34. The system as defined in claim 33, further comprising a peripheral outputting device, wherein when instructions to output the document have been received by the document rendering application executing in the processor and all unrendered portions of the document have been rendered into the output buffer, the processor executes an application that outputs a signal to the peripheral outputting device to:
   transfer the rendered document from the output buffer to the peripheral outputting device for formatting for outputting of the document by the peripheral outputting device.

35. The system as defined in claim 34, wherein the peripheral outputting device is selected from the group consisting of a Graphical Display Interface (GDI) printer and a printer interpreting a page description language.

36. The system as defined in claim 34, wherein:
   the peripheral outputting device is a first network resource in communication with an interconnecting network; and
   the processor and the memory are included in a second network resource in communication with the interconnecting network.

37. The system as defined in claim 32, wherein when all unrendered portions of the document have been rendered into the output buffer, the processor executes an application that outputs a signal capable of being received by a peripheral outputting device to:
   transfer the rendered document in the output buffer to the peripheral outputting device; and
   format the transferred rendered document from the output buffer into a format to be output by the outputting device.

38. A system comprising a processor and a memory including a document, a document editing application, a document rendering application, and an output buffer, wherein:
   when the document is opened for editing by the document editing application executing in the processor and any unedited portion thereof has not been rendered to the output buffer with the document rendering application executing in the processor, and when a predetermined portion of cycles of the processor are available for executing instructions, rendering the unedited portion of the document to the output buffer with the document rendering application executing in the processor,
   the document rendering application executing in the processor is:
      suspended from the rendering of the unedited portion of the document to the output buffer when a predetermined interrupt is received by the processor; and
      resumed from the suspension to continue the rendering of the unedited portion of the document to the output buffer after the predetermined interrupt received by the processor has been serviced;
   when the document is edited by the document editing application executing in the processor to form an edited portion thereof, setting as unrendered any said rendered portion of the document from the output buffer corresponding to the edited portion and resetting the edited portion of the document as being another said unedited portion.

39. The system as defined in claim 38, wherein when the processor executes instructions that are received to output the document, the document rendering application executing in the processor renders any unrendered portion of the document to the output buffer until all unrendered portions of the document have been rendered into the output buffer.

40. The system as defined in claim 39, further comprising a peripheral outputting device, wherein when instructions to output the document have been received by the document rendering application executing in the processor and all unrendered portions of the document have been rendered into the output buffer, the processor executes an application that outputs a signal to the peripheral outputting device to:
   transfer the rendered document in the output buffer to the peripheral outputting device; and
   format the transferred rendered document in the peripheral outputting device for outputting.

41. The system as defined in claim 40, wherein:
   the output buffer is a printer buffer; and
   the signal contains printer control language and is issued by a printer driver executing in the processor for controlling the peripheral outputting device.

42. The system as defined in claim 40, wherein the signal is communicated to a printer engine executing on a processor of the peripheral outputting device.

43. The system as defined in claim 40, wherein the signal from the processor initiates:
   a transfer of the rendered document in the output buffer to the peripheral outputting device; and
   a formatting of the transferred rendered document from the output buffer into a format to be output by the peripheral outputting device.

44. A computer-implemented method embodied on a computer-readable medium a document for output, comprising:
   opening the document to allow editing;
   beginning a process of pre-rendering the document into a format expected by an output device;
   upon modification of the document, aborting the pre-rendering process and discarding pre-rendered output;
   beginning a new process of pre-rendering the document including the modifications; and
   in response to a command, outputting the pre-rendered document.

45. The method of claim 44, wherein the document is a word processing document.

46. The method of claim 44, wherein the document is a spread sheet.

47. The method of claim 44, wherein the document is a desk top publishing document.

48. The method of claim 44, wherein the pre-rendering is performed by a computer upon which the document is opened.

49. The method of claim 44, wherein the pre-rendering is performed by a printer driver.

50. The method of claim 44, wherein the output device is a printer.

51. The method of claim 44, wherein the output device is a digital press.

52. The method of claim 44, wherein the expected format is a bit map image.

53. The method of claim 44, additionally comprising, at the output device, formatting the pre-rendered document for printing.

54. The method of claim 44, wherein all of the document was pre-rendered prior to the command.

55. The method of claim 44, wherein only a portion of the document was pre-rendered prior to the command.

56. The method of claim 44, wherein the process of pre-rending is performed only when a predetermined portion of processor is available.

57. The method of claim 44, additionally comprising repeating the aborting of the pre-rendering and the beginning the new process of pre-rendering as the document is edited prior to the command.

* * * * *

UNITED STATES PATENT AND TRADEMARK OFFICE
CERTIFICATE OF CORRECTION

PATENT NO. : 7,190,468 B2 Page 1 of 1
APPLICATION NO. : 10/196792
DATED : March 13, 2007
INVENTOR(S) : Mark L. Brown et al.

It is certified that error appears in the above-identified patent and that said Letters Patent is hereby corrected as shown below:

In column 3, line 16, delete "pre-rending" and insert -- pre-rendering --, therefor.

In column 7, line 1, delete "pre-rending" and insert -- pre-rendering --, therefor.

In column 7, line 30, delete "pre-rending" and insert -- pre-rendering --, therefor.

In column 12, line 55, in Claim 23, after "one" delete "of" and insert -- or --, therefor.

In column 12, line 62, in Claim 23, after "one" delete "of" and insert -- or --, therefor.

In column 16, line 33, in Claim 56, delete "pre-rending" and insert -- pre-rendering --, therefor.

Signed and Sealed this

Twenty-eighth Day of October, 2008

JON W. DUDAS
*Director of the United States Patent and Trademark Office*